ALPHONSE JEAN-BAPTISTE EDOUARD DARRAS.
TAXIMETER.
APPLICATION FILED APR. 19, 1907.

963,281.

Patented July 5, 1910.

7 SHEETS—SHEET 3.

Figure 4:
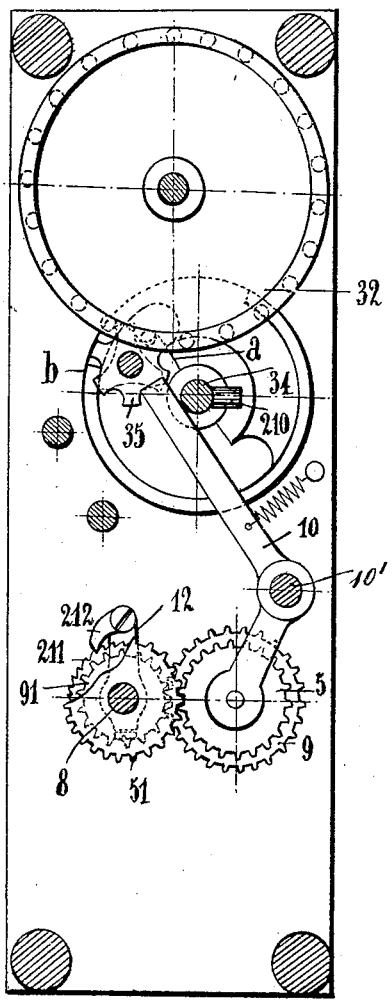

ALPHONSE JEAN-BAPTISTE EDOUARD DARRAS.
TAXIMETER.
APPLICATION FILED APR. 19, 1907.
963,281.
Patented July 5, 1910.
7 SHEETS—SHEET 4.
Fig. 4ª
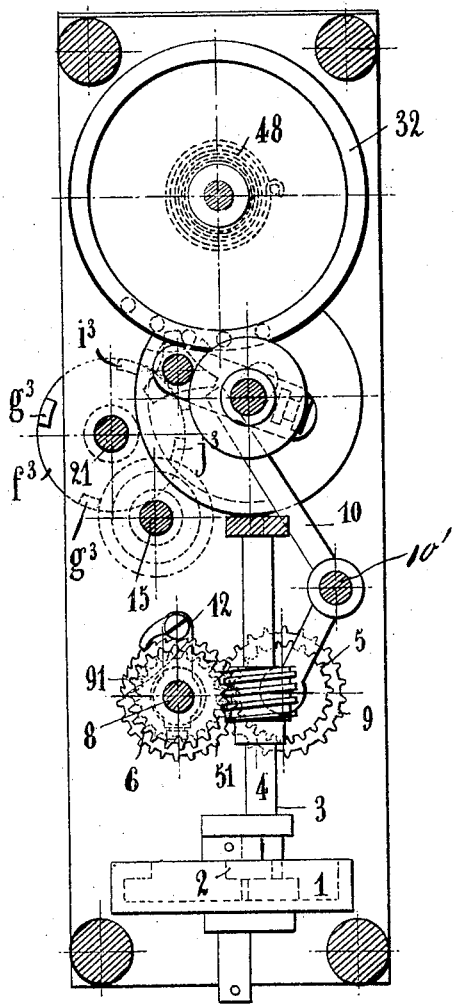

ALPHONSE JEAN-BAPTISTE EDOUARD DARRAS.
TAXIMETER.
APPLICATION FILED APR. 19, 1907.
963,281.
Patented July 5, 1910.
7 SHEETS—SHEET 5.
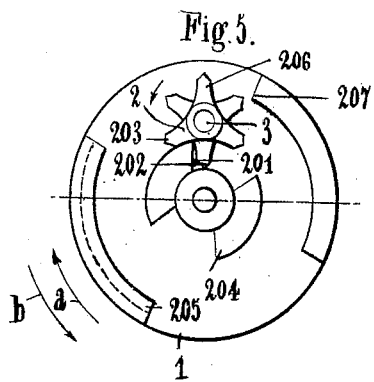
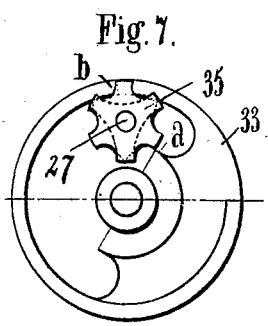
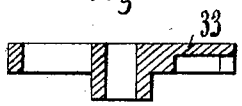
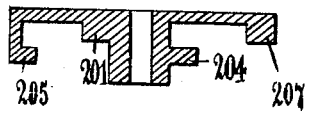
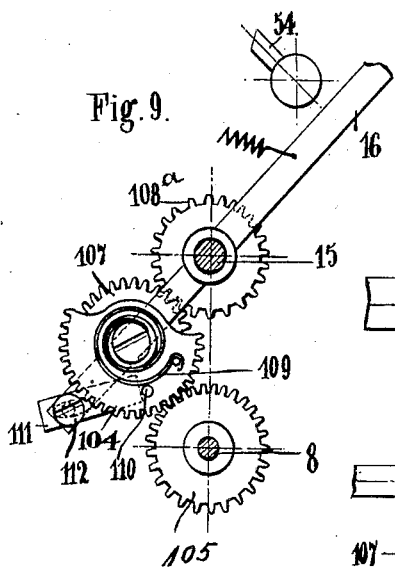
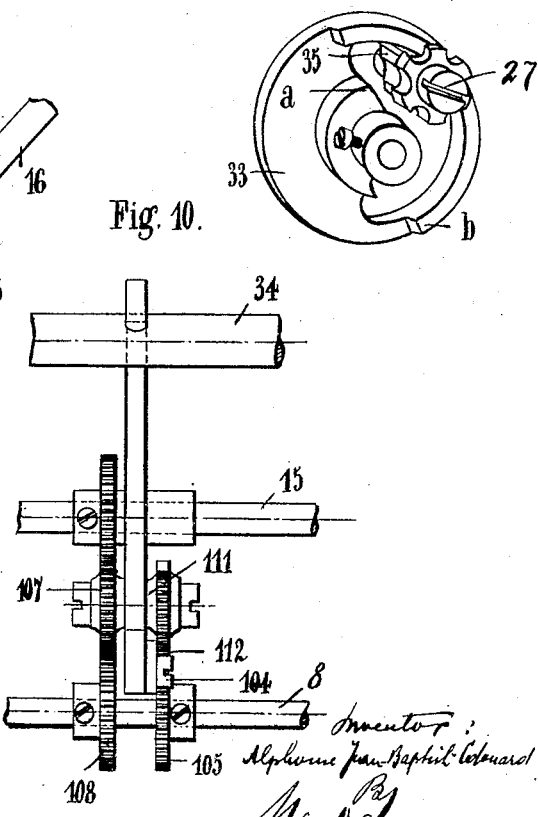

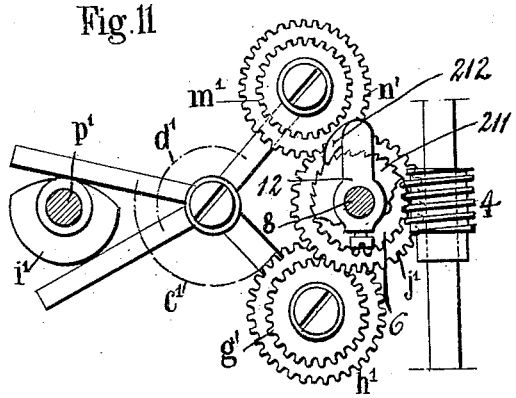
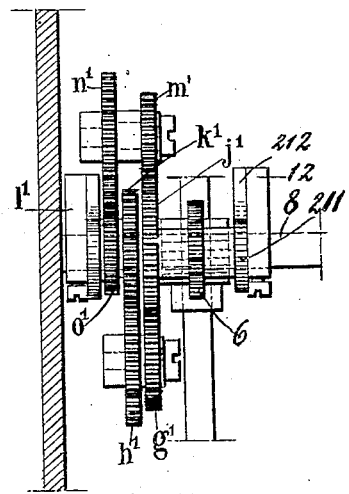
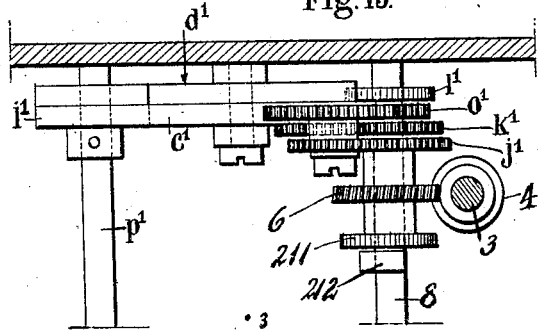
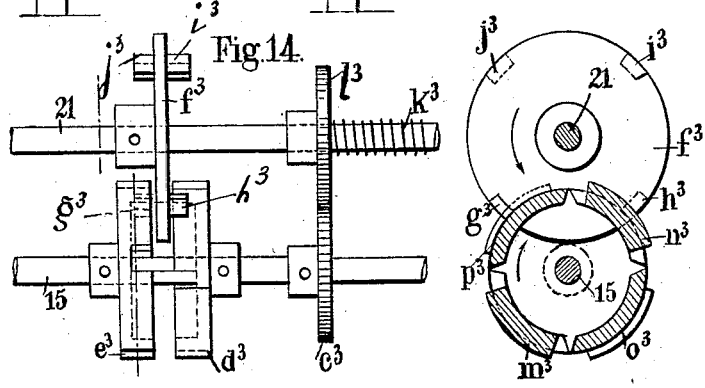

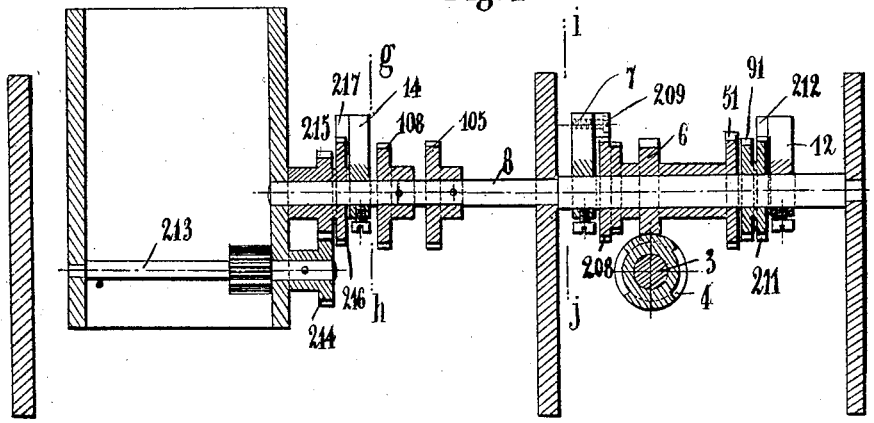
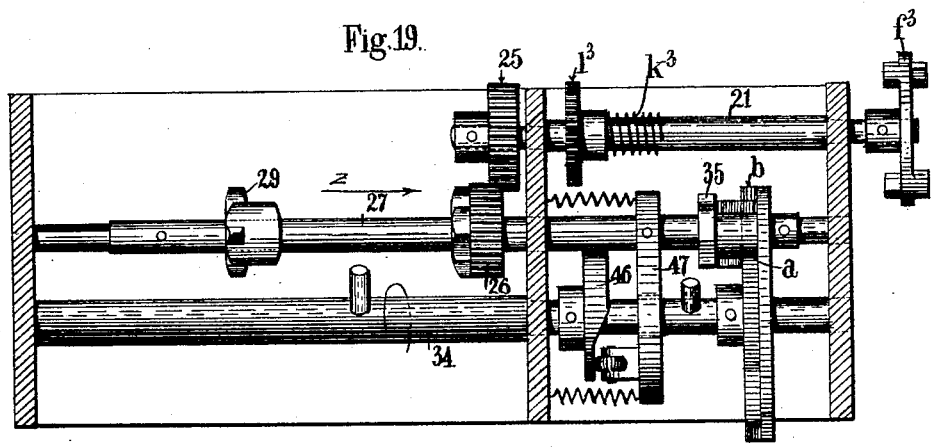
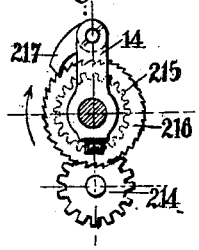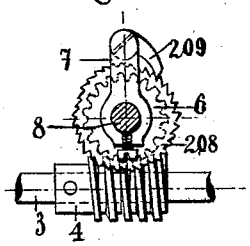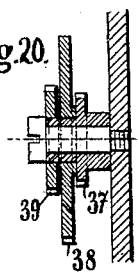

UNITED STATES PATENT OFFICE.

ALPHONSE JEAN-BAPTISTE EDOUARD DARRAS, OF PARIS, FRANCE.

TAXIMETER.

963,281.  Specification of Letters Patent.  Patented July 5, 1910.

Application filed April 19, 1907. Serial No. 369,118.

*To all whom it may concern:*

Be it known that I, ALPHONSE JEAN-BAPTISTE EDOUARD DARRAS, a resident of Paris, France, have invented certain new and useful Improvements in or Relating to Taximeters, of which the following is a specification.

This invention relates to a taximeter with multiple tariffs and of that kind in which the figure drums are intermittently rotated and returned to their original position upon the raising of the flag.

In order to make the following explanation as clear as possible, an apparatus according to this invention is illustrated, by way of example, in the accompanying drawings.

Figure 1:
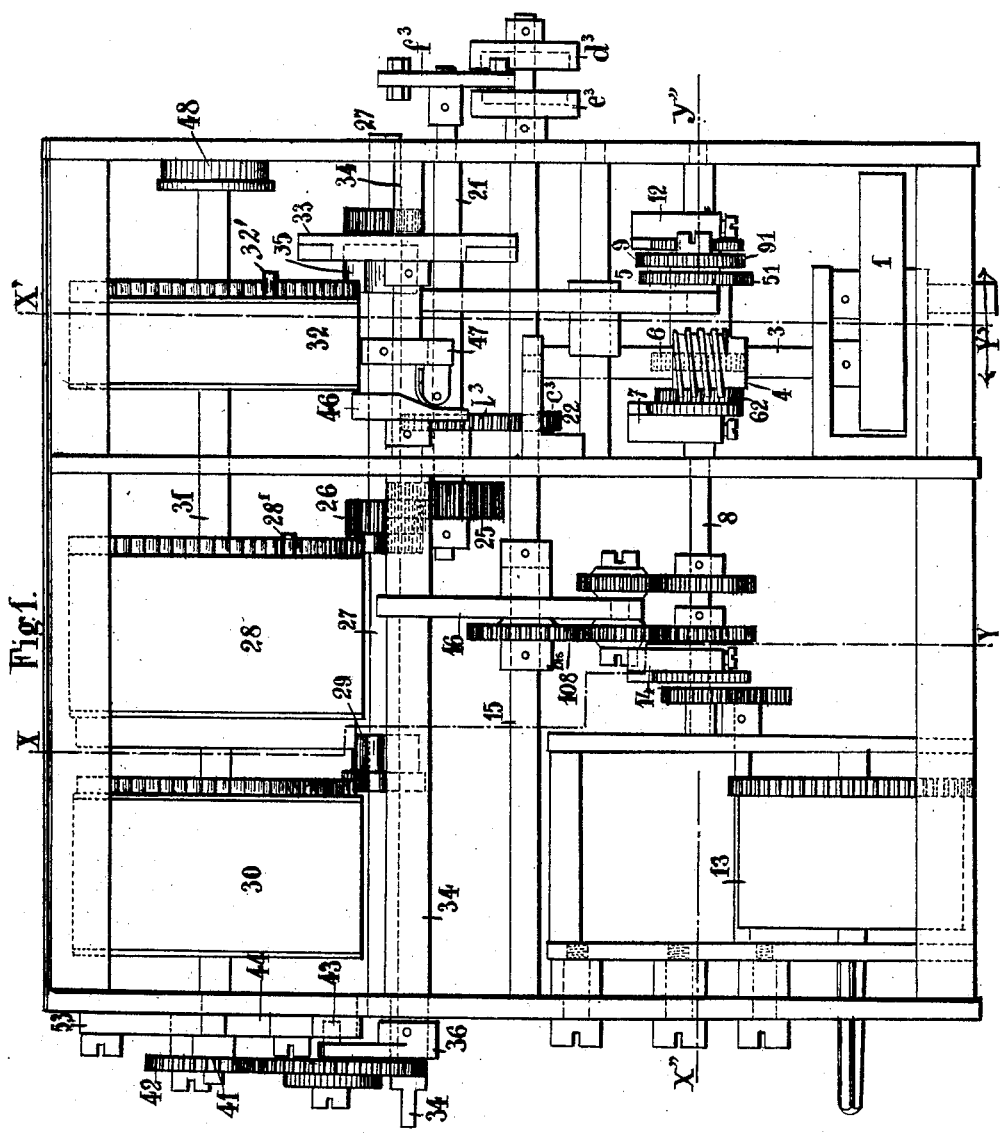
Figure 2:
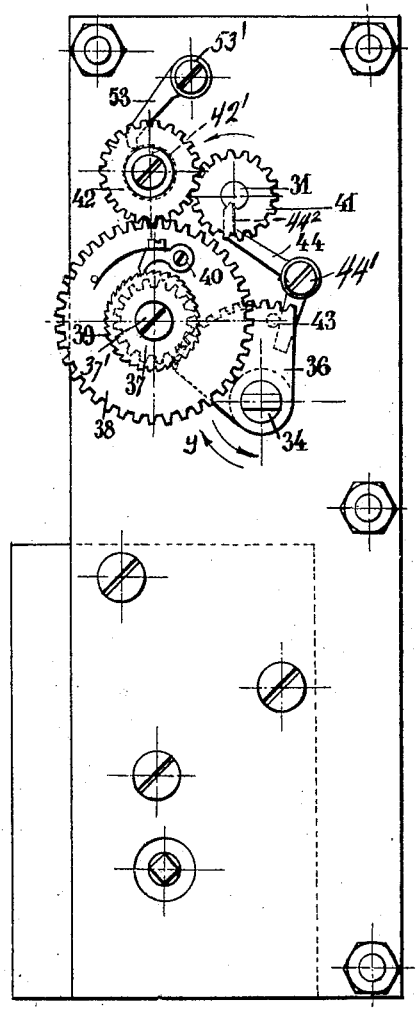
Figure 3:
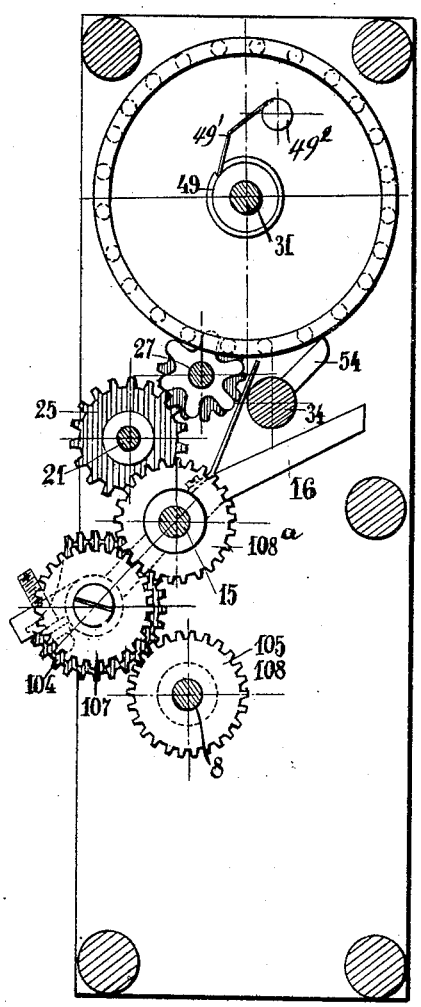
Figure 6:
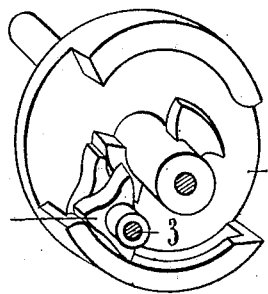

Figure 1 is a front elevation showing the device with all its parts assembled; Fig. 2 is a side elevation thereof; Fig. 3 is a vertical section on line X—Y of Fig. 1; Fig. 4 is a vertical section on line X'—Y' of Fig. 1 as seen in the direction of the right arrows; Fig. 4$^a$ is the same section as seen in the direction of the left arrows on Fig. 1; Figs. 5 and 5$^a$ are an elevation and cross section of the mechanism for controlling the distance traveled; Fig. 6 is a perspective view of the same; Figs. 7 and 7$^a$ are an elevation and cross section of the mechanism for controlling the supplements; Fig. 8 is a perspective view thereof; Figs. 9 and 10 are a front and side elevation of the device for varying the starting charge; Figs. 11 and 12 are an elevation and side view of a modification for controlling three tariffs by the spindle of the tariff-changing drums; Fig. 13 is a plan view thereof; Figs. 14 and 15 are a plan view and an elevation, respectively, of the mechanism for advancing the figure drums; Fig. 16 is a horizontal section on line X''—Y'' of Fig. 1 showing the control of the device by the movement of the clock and of the distance; Fig. 17 is a section on line $g$—$h$ of Fig. 16 showing the differential gear depending upon the movement of the clock; Fig. 18 is a section on line $i$—$j$ of the Fig. 16 showing the mechanism controlled by the distance movement; Fig. 19 is a top plan view of the apparatus, the figure drums having been removed; Fig. 20 is a cross section through some of the gears shown in Fig. 2.

As illustrated in the drawings, the apparatus comprises two horo-mile tariffs, one being double that of the other. The terms mile and horo-mile tariffs are used to describe two different conditions of traveling—for mile tariff the driver may travel at any speed and for horo-mile tariff he must not go at less than a given speed.

The flag can occupy four positions for the control of the parts: (1) free, (2) first tariff, (3) second tariff, and (4) supplementary payments.

The transmission of movement to the apparatus is obtained by a piece 1 (Figs. 1, 5, 5$^a$ and 6), causing it to move always in the same direction, whatever be the movement of the piece 1 and that of the vehicle (either forward or backward). This piece 1 consists of a rotary disk or wheel provided with stepped outer or circumferential flanges or wings 205, 207 and inner or central wings 201 and 204. The inner wings are displaced to one another (Figs. 5$^a$ and 6). The pinion 2 consists of two triangular parts arranged one behind the other and having their teeth displaced to one another (Fig. 6), in such a manner that the teeth of one part project into the path of one of the inner wings and one of the outer wings, and the teeth of the other part project into the path of the other inner and outer wings. The inner and outer wings are also displaced relative to one another, so that during the rotation of the piece 1 in one direction, the inner wings only will alternately coöperate with the teeth of the pinion 2 and during its rotation in reverse direction the outer wings only will alternately coöperate therewith. The pinion 2 is mounted on a spindle 3 which is provided with a worm 4 having in the present case two right hand threads. The number of threads and their direction may be varied according to the requirements. The worm 4 engages with a worm wheel 6 loosely mounted on a spindle 8, which we will call the main spindle of the mechanism (tariff No. 1). This worm wheel 6 is integral with a ratchet wheel 208 (Figs. 1, 16 and 18), with which coöperates a pawl 209 pivoted in an arm 7 which is fixed upon the spindle 8, so that the worm wheel 6 is caused to drive the spindle 8 in one direction. The worm wheel 6, ratchet wheel 208 and pawl 209 form a differential gear and permit of the spindle 8 being driven with a higher speed than that imparted thereto by the movement of the vehicle, in which case the pawl 209 will be allowed to simply slide over the teeth of the ratchet wheel 208. On the other hand, a clockwork 13 of suitable construction also controls the spindle 8. For this purpose upon the latter a gear is provided which consists of a pinion 215 loosely mounted on the spindle 8 and which is solid with a ratchet wheel 216 that coöperates with a pawl 217 carried by the lever 14 fixed to the spindle 8. The pinion 215 meshes with a pinion 214 carried by an intermediate spindle 215 of the clockwork 13 (Figs. 1, 16 and 17). This mechanism allows the spindle 8 to be driven by the preponderating movement produced either by the clockwork or by the car.

Rotatively secured upon a spindle 10' parallel to the spindle 8 is a satellite clutch consisting of a spring actuated double-armed lever 10, the lower arm of which carries two gears 5 and 9 arranged at the side of one another, of which gear 5 receives movement from gear 51 that is solid with the worm wheel 6, and by the wheel 9 transmits it to the wheel 91 with which it is coupled. In consequence of the different number of teeth of the gearing (which may be determined according to the tariff desired), the wheel 91 will have a higher speed than the wheel 51 (Figs. 1 and 16). The rotation of the wheel 91 is transmitted to the spindle 8 by a ratchet wheel 211 coupled with the wheel 91, and with which coöperates a pawl 212 pivoted to a lever 12 fixed on the spindle 8. The ratchet wheel 211, pawl 212 and lever 12 form a second differential gear permitting of the transmission to the spindle 8 a higher speed when the apparatus is set to the second tariff.

If the apparatus were to comprise distance or mile tariff only, that is to say without the intervention of the clockwork, the latter could be stopped at the desired moment by means of a special device.

When the apparatus is working the spindle 8 transmits its movement to a spindle 15 extending parallel thereto by a satellite clutch which is as follows: A spring actuated lever 16 is rotatively mounted on the spindle 15 and carries on its lower arm a toothed sector 104 (Figs. 1, 3, 9 and 16), which normally is in engagement with a wheel 105 keyed to the spindle 8, and a smaller wheel 107, which prevents the sector from engaging with and from being rotated by the wheel 108 of the spindle. This engagement can take place only at the moment when the toothed sector 104 will have effected a rotation corresponding to its teeth. At that moment the wheels 104 and 105 become out of engagement, permitting the lever 16 to move and have its wheel 107 engage with the wheel 108, whereby movement is transmitted to the spindle 15 by the wheel 108$^a$ keyed thereon.

A spindle 34 which carries the flag (not shown), and which we will call the flag spindle, is provided with a projection 54, which upon the swinging of the flag and spindle comes into the path of the satellite clutch lever 16 and raises the latter. In consequence thereof the sector 104 under the influence of a spiral spring 109 is caused to return into the initial position. The return movement of said sector is limited by a step 110 projecting from the sector and a part 111 adjustably secured to the lever 16 by a set screw 112, so as to control the stroke of the movement of the sector 104 in accordance with the tariff desired.

The transmission of movement to the figure drums is accomplished as follows: On the outer end of the spindle 15 (Figs. 1, 14 and 15) are fixed two notched disks $e^3$ and $d^3$ facing one another and having their notches displaced relatively to one another. Upon a spindle 21 a disk $f^3$ is arranged which is provided on its two faces at alternate points with projections $g^3$, $h^3$, $i^3$ and $j^3$. This disk projects into the space between the two notched disks, so that its projections are situated in the paths of the notches of the said disks $d^3$, $e^3$. When any one of the projections of the disk $f^3$ is engaged with any of the notches of any one of the disks $d^3$, $e^3$, the disk $f^3$ will be stopped. During their rotation the disks $d^3$, $e^3$ successively present their respective recesses to each of the corresponding projections. At the moment of release of the disk $f^3$ which is controlled by the spring $k^3$, of which one end is secured to the spindle 21, the disk $f^3$ suddenly escapes and quickly executes together with the spindle 21 a fraction of a revolution, whereupon it is again stopped by the successive projections. The other end of the spring is secured to a wheel $l^3$ loose on the spindle and engaging with a wheel $c^3$ keyed on the spindle 15. The latter consequently cocks the spring $k^3$ to the necessary extent for the next escapement. The circumferences of the recessed disks $d^3$ and $e^3$ are provided with thickened portions $m^3$, $n^3$, $o^3$, $p^3$ (Fig. 15), which strike against one of the projections of the disk $f^3$ when, owing to the disengagement of the spindle 15, the latter rotates in the opposite direction under the influence of the action of the spring $k^3$ acting through the wheel $l^3$.

The spindle 21 thus receives at intervals which are determined by the tariff adopted, an intermittent rotary motion which must correspond to the passage of a figure. To that end, to the spindle 21, a wheel 25 is keyed which engages with the pinion 26 loosely mounted on a spindle 27 parallel to the spindle 21 and which we will call the pinion spindle. This pinion 26 engages with the continuous teeth of the drum 28 (of cents), the circumference of which is arranged so as to receive figures for that purpose. The registration of dollars is effected on a second drum 30 by means of a pinion 29. The spindle 31 which loosely carries these drums and which is acted upon by a spring 48 (Fig. 1) bears another figure drum 32 designed for supplementary charges. The pinion 29, 26 and the pinion 35 feeding the drum 32 are arranged equidistant from one another upon the pinion spindle 27, and the teeth upon the pinions 26 and 29 are so arranged that they only occupy half of the width of said pinions, so that when, as will be hereinafter specified, they are displaced in longitudinal direction, the blank reduced portion of one of said pinions is engaged by the edge of the drum 28, while the blank portion of the other takes the place of the toothed portion which previously geared with the teeth upon the same drum. Upon the displacement of the pinions the drums become released. On the outside of the casing the flag spindle carries a toothed sector 36 provided with a projecting pin 43. Pivotally secured to the casing at 44′ is a double-armed lever 44, the lower arm of which normally is adapted to rest in contact with the pin 43 of the sector 36 and the upper arm of which is provided with a nose 44² that normally engages into a notch made in the outer end of the spindle 31. Upon a spindle 37′ borne in the side of the casing is a toothed wheel 37 which normally meshes with the toothed sector 36 and which is solid with a larger wheel 38 (Figs. 1, 2 and 20), that meshes with a wheel 42 and is also solid with a ratchet wheel 39, with which coöperates a spring actuated pawl 40 pivoted at 40′ to the wheel 38. Mounted on the outer end of the spindle 31 is a toothed wheel 41 which meshes with the wheel 42. The pin 44² of the upper arm of the lever 44 engaging the spindle 31 prevents the latter from revolving. By swinging the flag in a certain direction the pin 43 of the sector 36 raises the lower arm of the lever 44 causing the projection or pin 44² of the upper arm to disengage from the notch in the spindle 31, thereby releasing the latter, so that it can turn under the action of its spring 48. Keyed upon the spindle 31 at one side of the drums are notched sleeves 49 (Fig. 3), with which normally spring blades or pawls 49′ secured to the drums at 49² are engaged, whereby the drums are caused to participate in the movement of the shaft 31, until one tooth of the continuous teeth suitably selected for each of them and made longer than the others, as 28′, 32′, strikes one of the blades of the pinions 29, 26 and 35, whereby the drums are set at their starting point. The pawl 53 pivoted at 53′ coöperating with a notched sleeve 42′ is adapted to prevent the spindle 31 from making more than one revolution at a time.

In order to fulfil the requirements of different combinations of prices and tariffs the teeth of the figure drums may be made of odd and even number and the indications of figures to be made on the drums, viz: the indications of dollars and cents can follow their natural order of progression, such as, 1, 2, 3, 4, 5, etc., or receive figures with other figures interposed, as 0, 10, 1, 11, 2, 12, 3, 13, 4, 14, etc.

The mechanism for registration of supplements is as follows:—To the flag spindle 34 is keyed a recessed disk 33 (Figs. 1, 7, 7ª and 19), which is provided with inner and outer flanges or wings a and b, respectively. Loosely mounted on the spindle 27 is the above-named tappet wheel or pinion 35 which is adapted to alternately engage with the wings a and b when the flag spindle is reciprocated. This pinion 35 in its turn engages with the projecting teeth 32′ of the drum 32 (Fig. 1).

The mechanism for bringing the drums and the distributing parts back to the point of starting is as follows:—Keyed upon the spindle 34 is a cam 46 which coöperates with a spring actuated roller lever 47 rigidly secured to the slidable pinion shaft 27 (Figs. 1 and 19). By the rotation of the flag spindle 34 the cam 46 in acting against the roller of the lever 47 causes the spindle 27 to be longitudinally displaced in the direction indicated by the arrow z (Fig. 19).

There may be arranged a series of totalizers to make it possible to obtain the sum of—1, the whole distance traveled by the car; 2, the different starting charges; 3, the sums paid by the fares (10¢), and 4, the supplements.

In certain cases or by reason of the mounting of the apparatus upon the vehicle and its being impossible for the driver to observe the amounts indicated on the dial (on the side of the fare), a series of prisms or mirrors might be provided, in order that this may be rendered possible. These prisms or mirrors may be movable or fixed and may be disposed within or without the case of the apparatus within the reach of the driver and able to assume such different inclinations that control may be exercised.

Figs. 11, 12 and 13 represent a modification, whereby three changes of tariff may be obtained. In this modification there are two satellite clutches employed consisting of levers c′, d′, of which c′ carries gears g″, h′ and d′ carries gears m′, n′. The levers c′, d′ are operated by a cam i′ borne on a spindle p′. The worm 4 actuated, as in the first instance, by the movement of the vehicle controls the worm wheel 6, which is solid with a wheel j′, the ratchet wheel 211, with which coöperates the pawl 212 pivoted to the lever 12 and forming a differential gear similar to the one described in the first instance.

Loosely mounted on the main shaft 8 is a wheel $o'$ which is solid with a wheel $k'$ and a ratchet wheel $o^2$, with which coöperates a pawl $o^3$ pivoted to a lever arm $l'$ fixed to the shaft 8. This gear constitutes a second differential gear. In the case of the first tariff which should be the slowest, the two levers $c'$, $d'$ are disengaged and movement is directly transmitted to the main shaft 8 through the worm wheel 6 and the above-named first differential gear. At the second tariff the two wheels $g'$ and $h'$, the number of teeth of which has been suitably calculated, respectively engage $g'$ with $j'$ and $h'$ with $k'$, thus transmitting the movement to the main shaft through the second differential gear. At the third tariff the cam $i'$ is so manipulated that the wheels $g'$ and $h'$ are first disengaged from the wheels $j'$ and $k'$, and the wheels $m'$ and $n'$, respectively engage the wheel $m'$ with the wheel $j'$ and the wheel $n'$ with the wheel $o'$, thus transmitting a different movement to the main shaft 8 through the second differential gear.

Having now particularly described and ascertained the nature of my said invention and in what manner the same is to be performed, I declare that what I claim is:—

1. In a taximeter, the combination with the figure drums, of a continuously revolving spindle 15, notched disks secured thereon and arranged with their notches opposite one another, a spindle 21 driving the figure drums, a disk secured to said spindle, projections on both sides of said disk adapted to pass between the said notched disks and to be alternately engaged by the notches of the latter, and a spring actuating the spindle 21 and adapted to be cocked by the spindle 15, for the purpose set forth.

2. In a taximeter, the combination with the figure drums, of a continuously revolving spindle 15, notched disks secured thereon and arranged with their notches opposite one another, a spindle 21 driving the figure drums, a disk secured to said spindle, projections on both sides of said disk adapted to pass between the said notched disks and to be alternately engaged by the notches of the latter, gears on the said two spindles constantly meshing with one another and a spring connecting the spindle 21 to its gear, said spring being cocked by the said gears at the rotation of the spindle 15, for the purpose set forth.

3. A taximeter having figure drums which are intermittently rotated and returned to the original position upon the raising of the flag, comprising toothed figure drums, a spindle, pinions carried by said spindle and transmitting rotation to the figure drums, a flag spindle, a rotary disk on said spindle provided with a lateral cam, and means secured to the pinion spindle and actuated by said cam to be displaced longitudinally and to cause the release of the pinion from the figure drums.

4. A taximeter having figure drums which are intermittently rotated and returned to the original position upon the raising of the flag, comprising toothed figure drums, a spindle carrying the latter, a pawl locking said spindle and which is thrown out of gear when the flag is raised, a spring turning the said spindle to move the drums into the original position and a second pawl preventing the drum spindle from rotating beyond one complete revolution, substantially as set forth.

5. A taximeter having figure drums which are intermittently rotated and returned to the original position upon the raising of the flag, comprising toothed figure drums, each having an extended tooth in its series of teeth, and pinions meshing with said toothed drums, the extended tooth of each drum being adapted, when striking the corresponding pinion, to stop the said figure drum, putting it at its starting point, substantially as set forth.

6. A taximeter comprising figure drums, a worm driven in accordance with the movement of the vehicle, a worm wheel engaging therewith, a spindle, a differential gear for transmitting the movement of said worm wheel to the figure drums, two levers, carrying toothed wheels for the purpose of obtaining a different ratio of transmission and a spindle for setting the tariff, said toothed wheels being alternately coupled to the worm wheel when the said levers are moved by the rotation of the said tariff spindle, substantially as set forth.

7. In a taximeter, the combination with a manually operated flag spindle 34, of a spring actuated spindle 31, toothed figure drums loosely mounted on the latter spindle, a spindle 27, pinions 29, 26, 35 mounted on the latter, the pinions 29, 26 being braced together, and adapted to engage respectively with the drums indicating dollars and cents, a spindle 21 receiving at times an intermittent rotary movement, a pinion 25 keyed to it and meshing with one of above named pinions, a cam keyed on spindle 34, a spring actuated lever secured to spindle 27 and operated by said cam to displace the latter and release the drums, means for releasing the drum spindles simultaneously with the release of the drums and allow of its revolving by the action of its spring, means for allowing the automatic coupling of the drums with their spindle and means for preventing the said drum spindle from making more than one revolution at a time, substantially as set forth.

8. In a taximeter, the combination with a manually operated spindle, a spring actuated spindle 31, figure drums loosely mounted on said spindle, means for allowing the automatic coupling of said drums with their spindle, a toothed sector keyed on the manually operated spindle, a projection on said sector, a pawl operated by said sector and engaging a notch in the drum spindle, and means for preventing the released drum spindle from making more than one revolution, substantially as set forth.

Signed at Paris this 8 day of April 1907.

ALPHONSE JEAN-BAPTISTE EDOUARD DARRAS.

Witnesses:
 EMILE LEDRET,
 H. C. COXE.